Figure 1:
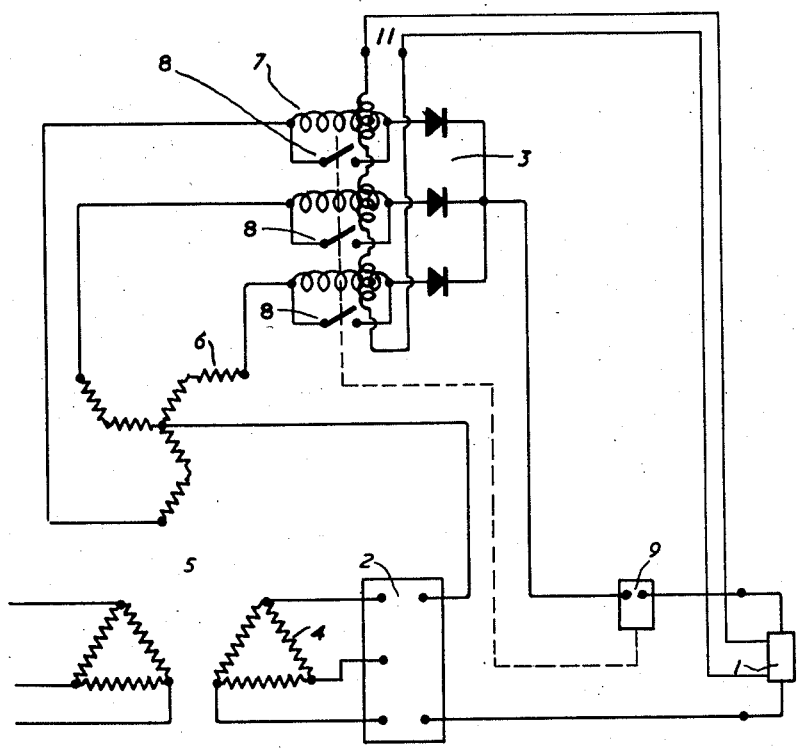

May 13, 1958

A. H. B. WALKER 2,834,931

MEANS FOR SUPPLYING INTERMITTENT OVERLOAD
CURRENTS FROM VOLTAGE REGULATING
RECTIFIER SETS

Filed July 6, 1954

INVENTOR
ALEC HERVEY BENNETT WALKER,

BY Robert B. Pearson

ATTORNEY

United States Patent Office 2,834,931
Patented May 13, 1958

2,834,931

MEANS FOR SUPPLYING INTERMITTENT OVERLOAD CURRENTS FROM VOLTAGE REGULATING RECTIFIER SETS

Alec H. B. Walker, King's Cross, London, England, assignor to Westinghouse Brake & Signal Company Limited, London, England Application July 6, 1954, Serial No. 441,469

Claims priority, application Great Britain July 6, 1953

5 Claims. (Cl. 321—20)

This invention relates to means for supplying intermittent overload currents from voltage regulated rectifier sets.

Rectifier sets are required, especially for the servicing of aircraft, which have a closely regulated output voltage so long as the load does not exceed a predetermined value but which will provide large overload currents for short duration when called upon to do so. For example, the set may be required to supply a predetermined load at constant voltage necessary for servicing an aircraft and supplying current for such of its electrical equipment which has to be kept operating whilst the aircraft is on the ground, and yet may be called upon to provide heavy overload currents required for starting the engine.

For the first of the above requirements, that is to say, the provision of a limited load at constant voltage, an eminently suitable apparatus is that comprising a main rectifier and a boost rectifier, the voltage regulation being obtained in known manner by controlling the output of the boost rectifier. With this arrangement the size of the boost rectifier and its associated control apparatus depends upon the degree of variation in load for which it is desired to compensate and accordingly, if it is designed to cater only for the variations to be met with during normal servicing it will be unable to cope with the overload currents called for during engine starting, whereas, if the boost unit is made large enough to cater satisfactorily with the engine starter loads, it will be much larger than is required for the ordinary servicing and will thus be uneconomic.

The output of the boost rectifier is, in a known arrangement, controlled by a transductor the alternating current winding of which is connected in the alternating current supply circuit to the boost rectifier, the output being determined by the energisation of the direct current control winding of the transductor, itself controlled automatically in accordance with the load voltage.

According to the invention, means are provided for supplying direct current to a load circuit from an alternating current source through a main rectifier and a boost rectifier, the output of the boost rectifier being controlled in accordance with the voltage across the load circuit by means of a transductor having its alternating current winding connected in the alternating current supply circuit to the boost rectifier in which means are provided for automatically by-passing a part or the whole of said alternating current winding when the load current exceeds a predetermined magnitude.

Should the short-circuiting of the transductor winding result in too great a boost voltage, the voltage of the alternating current supply circuit in which the transductor winding is connected may be reduced simultaneously with said short-circuiting, and should the short circuiting of the transductor winding result in too low a boost voltage, the voltage of said supply circuit may be increased simultaneously with said short-circuiting.

Figure 2:
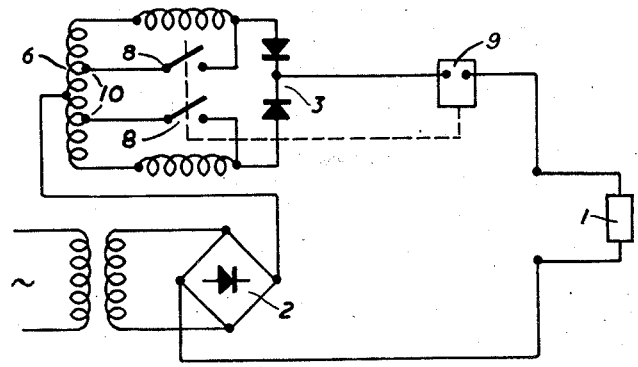

The invention is illustrated, by way of example, in the accompanying drawing, of which Figure 1 and 2 show two different embodiments of the invention.

Figure 1 shows an arrangement in which a load circuit 1 is supplied with direct current from a three phase alternating current source through a main rectifier 2 and a series connected three phase boost rectifier 3. The main rectifier 2 is supplied with alternating current from a main secondary winding 4 of a transformer 5, an auxiliary secondary winding 6 of which feeds the boost rectifier 3 in series with the three phase alternating current winding 7 of a transductor the impedance of which is controlled by the energisation of a direct current control winding 11 in accordance with the load voltage in known manner. Each phase of the alternating current winding of the transductor has connected across it a normally open contact 8 in such a manner that when the contact is closed, each phase of said transductor winding is short-circuited. Connected in series with the load circuit is a current relay 9 designed to operate to close the contacts 8 when the current taken by the circuit exceeds a predetermined magnitude. It will thus be seen that when the load current exceeds the predetermined value the alternating current winding 7 of the transductor is automatically short-circuited and the full alternating voltage appearing across the transformer auxiliary secondary winding 6 is applied to the boost rectifier, under which conditions the latter continues to contribute a useful boost voltage to maintain the load voltage under heavy overloads.

Figure 2 shows an arrangement in which a load circuit 1 is supplied with direct current from a single phase alternating current source through a main rectifier 2 and a series connected boost rectifier 3, the boost rectifier being supplied with current from an auxiliary secondary winding 6. The contacts 8 are arranged to by-pass the alternating current winding of the transductor and to connect the boost rectifier to tappings 10 on the auxiliary secondary winding 6 so that, when the contacts are operated, the voltage of the supply from the auxiliary secondary winding is reduced, thereby avoiding excessive boost on overload.

By interchanging the connections of the transductor alternating current winding and the contacts, the voltage applied to the auxiliary rectifier when the contacts are operated may be increased, thereby ensuring a greater boost than could be achieved by merely short circuiting the transductor windings.

In order to provide some control over the output voltage under conditions of overload it may be arranged that only part of the transductor alternating current winding is short circuited.

It will be understood that if the boost rectifier is controlled by a transductor having a parallel connected single phase alternating current winding only one contact is required to bypass that winding. It will thus be seen that the invention provides means for supplying intermittent overloads automatically without the inclusion of any auxiliary rectifier which is idle for the majority of the working time of the rectifier set and which comes into operation only during intermittent overloads.

It will also be understood that in this specification the word transductor includes a plurality of single phase transductors arranged to control each phase of a polyphase circuit and the word winding includes a corresponding plurality of single phase windings.

Having thus described my invention what I claim is:

1. Means for supplying direct current to a load circuit from an alternating current source comprising, in combination, a main rectifier having input terminals and output terminals, a first alternating current supply circuit for supplying said input terminals, a boost rectifier having input terminals and output terminals, a second alternating current supply circuit for supplying said input terminals of said boost rectifier, the output terminals of said boost rectifier being connected in series with said output terminals of said main rectifier and said load circuit, a transductor having an alternating current winding connected in series with said second supply circuit, the impedance of said alternating current winding being controlled in accordance with the voltage across said load circuit and means for automatically short-circuiting at least a part of said alternating current winding when the current in said load circuit exceeds a predetermined magnitude.

2. Means for supplying direct current to a load circuit from an alternating current source comprising in combination, a main rectifier having input terminals and output terminals, a first alternating current supply circuit for supplying said input terminals, a boost rectifier having input terminals and output terminals, a second alternating current supply circuit for supplying said input terminals of said boost rectifier, the output terminals of said boost rectifier being connected in series with said output terminals of said main rectifier and said load circuit, a transductor having an alternating current winding connected in series with said second supply circuit, the impedance of said alternating current winding being controlled across accordance with the voltage in said load circuit a relay responsive to current flowing in said load circuit and a normally open contact connected across at least a part of each phase of said alternating current winding, said contact being controlled by said relay and operable to a closed position when the current in the load circuit exceeds a predetermined magnitude.

3. Means for supplying direct current to a load circuit from an alternating current source comprising, in combination, a main rectifier having input terminals and output terminals, a first alternating current supply circuit for supplying said input terminals, a boost rectifier having input terminals and output terminals, a second alternating current supply circuit for supplying said input terminals of said boost rectifier, the output terminals of said boost rectifier being connected in series with said output terminals of said main rectifier and said load circuit, a transductor having an alternating current winding connected in series with said second supply circuit, the impedance of said alternating current winding being controlled in accordance with the voltage in said load circuit a relay responsive to current flowing in said load circuit and a normally open contact connected across the whole of each phase of said alternating current winding, said contact being controlled by said relay and operable to a closed position when the current in the load circuit exceeds a predetermined magnitude.

4. Means for supplying direct current to a load circuit from an alternating current source comprising, in combination, a main rectifier having input terminals and output terminals, a boost rectifier having input terminals and output terminals, a transductor having an alternating current winding, a transformer having a main secondary winding for supplying said input terminals of said main rectifier and an auxiliary secondary winding the end terminals of which are connected to said input terminal of said boost rectifier through said alternating current winding of said transductor, the impedance of said alternating current winding being controlled in accordance with the voltage of the load circuit, a relay responsive to current flowing in said load circuit and a normally open contact one side of which is connected to an intermediate tapping point on said auxiliary secondary winding of said transformer and the other side of which is connected to an end terminal of said alternating current winding of said transductor remote from said auxiliary secondary winding, said contact being controlled by said relay and operable to a closed position when the current in the load circuit exceeds a predetermined magnitude.

5. Means for supplying direct current to a load circuit from an alternating current source comprising, in combination, a main rectifier having input terminals and output terminals, a boost rectifier having input terminals and output terminals, a transductor having an alternating current winding, a transformer having a main secondary winding for supplying said input terminals of said main rectifier and an auxiliary secondary winding intermediate tapping points on which are connected to said input terminals of said boost rectifier through said alternating current winding of said transductor, the impedance of said alternating current winding being controlled in accordance with the voltage of the load circuit, a relay responsive to current flowing in said load circuit and a normally open contact one side of which is connected to an end terminal of said auxiliary secondary winding of said transformer and the other side of which is connected to an end terminal of said alternating current winding of said transductor remote from said auxiliary secondary winding, said contact being controlled by said relay and operable to a closed position when the current in the load circuit exceeds a predetermined magnitude.

References Cited in the file of this patent

UNITED STATES PATENTS

| | | |
|---|---|---|
| 2,299,942 | Trevor | Oct. 27, 1942 |
| 2,322,955 | Perkins | June 29, 1943 |
| 2,547,162 | Kidd | Apr. 3, 1951 |